March 9, 1948. D. S. WILLSON 2,437,413
METER WITH CYLINDERS PARALLEL TO THE DRIVE SHAFT
Filed March 2, 1946 5 Sheets-Sheet 1

Inventor:
David S. Willson,
By
Attorney.

March 9, 1948. D. S. WILLSON 2,437,413
METER WITH CYLINDERS PARALLEL TO THE DRIVE SHAFT
Filed March 2, 1946 5 Sheets-Sheet 2
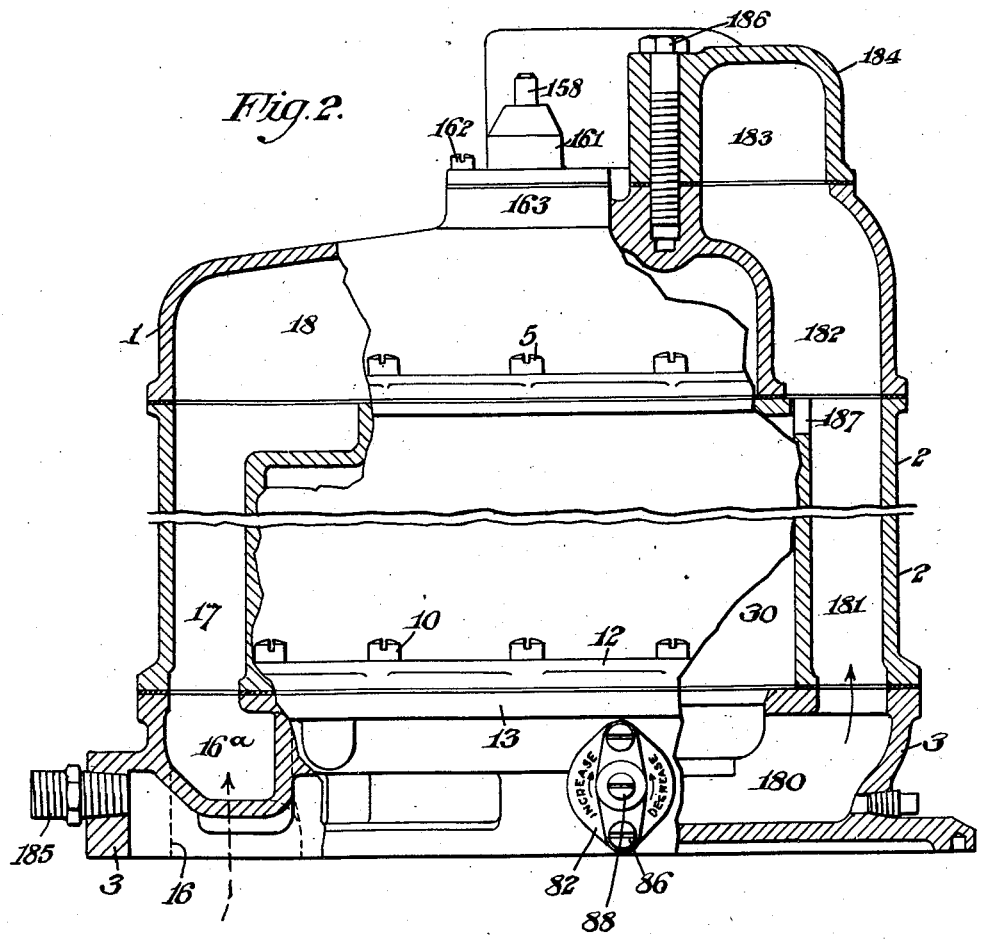
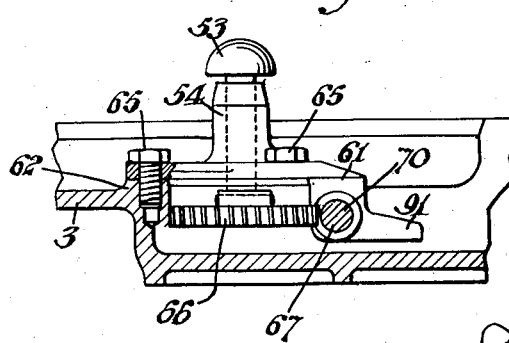
Inventor:
David S. Willson,
By ......
Attorney.

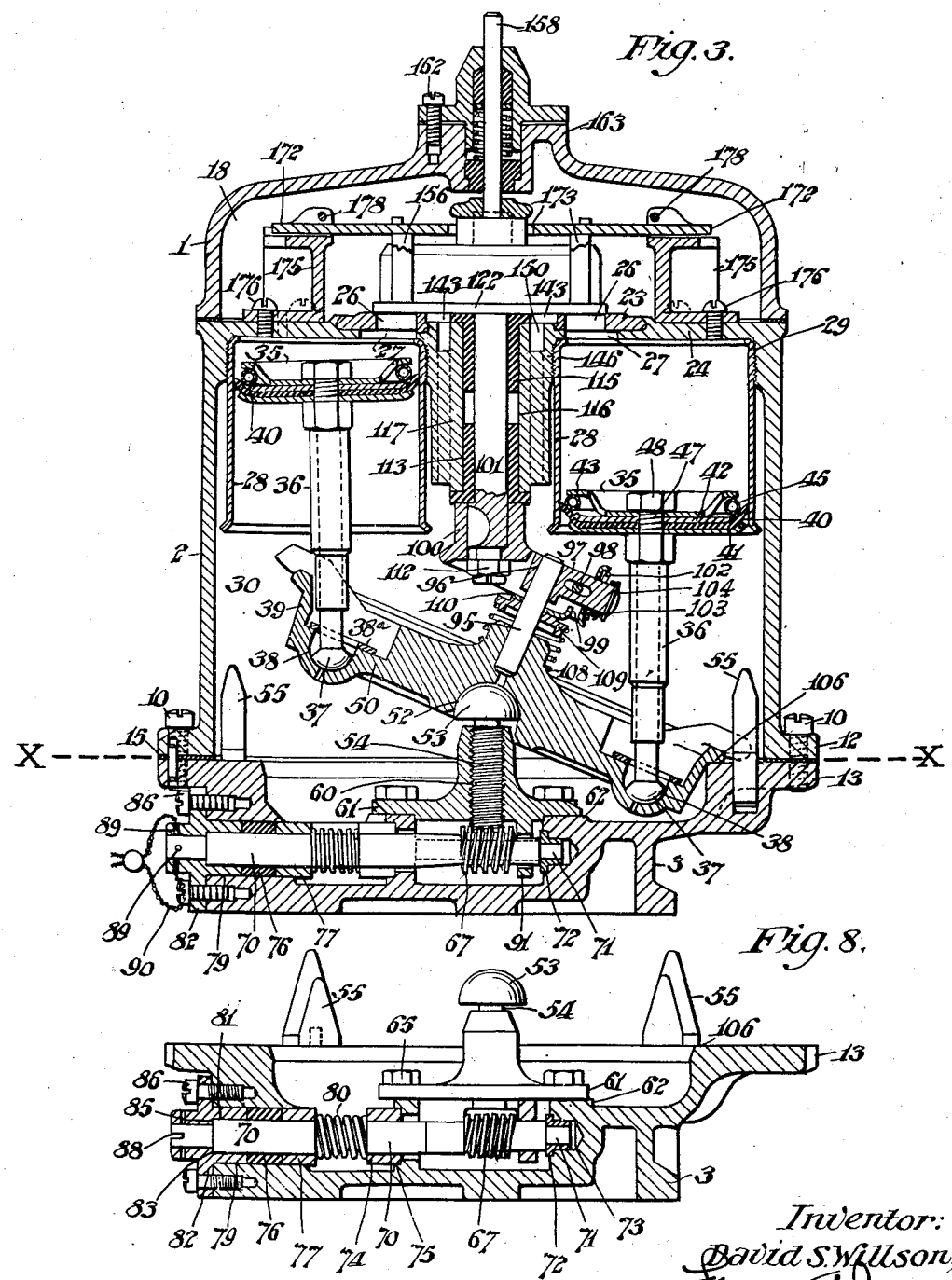

March 9, 1948.   D. S. WILLSON   2,437,413
METER WITH CYLINDERS PARALLEL TO THE DRIVE SHAFT
Filed March 2, 1946   5 Sheets-Sheet 4

Inventor:
David S. Willson,
By (signature)
Attorney.

March 9, 1948. D. S. WILLSON 2,437,413
METER WITH CYLINDERS PARALLEL TO THE DRIVE SHAFT
Filed March 2, 1946 5 Sheets-Sheet 5

Inventor
David S. Willson,
By [signature]
Attorney.

Patented Mar. 9, 1948

2,437,413

UNITED STATES PATENT OFFICE 2,437,413

METER WITH CYLINDERS PARALLEL TO THE DRIVE SHAFT

David S. Willson, Muskegon Heights, Mich., assignor to John Wood Manufacturing Company, Inc., Philadelphia, Pa., a corporation of Delaware Application March 2, 1946, Serial No. 651,447

3 Claims. (Cl. 121—119)

My invention relates to improvements in meters with cylinders parallel to the drive shaft of the positive displacement type which are particularly adaptable for use in dispensing apparatus which measures accurately the volume of fluid dispensed. My improved meter is also adaptable for other uses, such as for installation in a pipeline to measure accurately the volume of fluid flowing under pressure through the pipeline, etc.

One object of my invention is to provide a fluid meter which has a die cast body and top cover of small overall dimensions, but which has the same volumetric metering capacity as a larger dimensional fluid meter constructed in the ordinary manner.

Another object of my invention is to provide a fluid meter which has a die cast body in which the outlet ports are formed entirely around the top of the bearing column for the crank arm shaft.

Another object of my invention is to provide a fluid meter in which air contained therein resulting from an unprimed system is eliminated quickly when the full flow of liquid is established.

My invention includes the various novel features of construction, arrangement, and method of operation as hereinafter described.

In said drawings:

Fig. 2 is a vertical sectional view, partly in elevation, taken on the lines 2—2 in Fig. 1.

Fig. 3 is a vertical sectional view, partly in elevation, with the structure shown above the line X—X being taken on the line 3—3 in Fig. 1, and the structure shown below the line X—X being taken on the line 3A—3A in Fig. 1.

Fig. 8 is a vertical sectional view, partly in elevation, of the bottom closure shown in Fig. 7, and taken on the lines 8—8 in Fig. 7.

Fig. 9 is a fragmentary vertical sectional view, partly in elevation, of the bottom closure shown in Fig. 7, and taken on the same line of section as Fig. 2.

Figure 1:
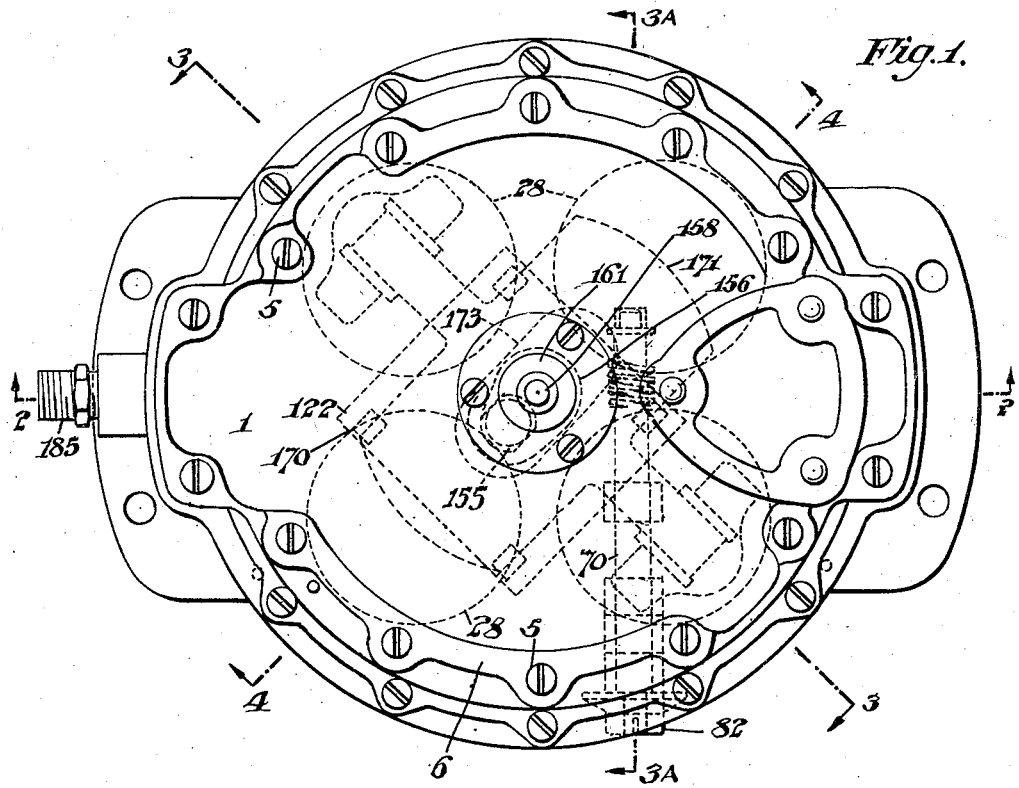
Fig. 1 is a top plan view of my improved meter.

Referring to said drawings; my improved meter is conveniently formed in three parts comprising a die cast top cover 1, a die cast main body casing 2, and base portion, or bottom closure 3, which may also be die cast, if desired. Said top cover 1 is rigidly connected to the body casing 2 by means of a circumferential series of screws 5 which extend through openings in the flange 6 of the top cover 1 into matching screw threaded holes 7 formed in the top wall of the body casing 2. A gasket 9 is interposed between the top cover 1 and the body casing 2 in order to maintain said top 1 and body casing 2 in fluid tight relationship. The bottom closure 3 is rigidly connected to the body casing 2 by means of a circumferential series of screws 10 which extend through openings in the flange 12 of the body casing 2 into matching screw threaded holes formed in the flange 13 of the bottom closure 3. A gasket 15 is interposed between the bottom closure 3 and body casing 2 to maintain said bottom closure 3 and body casing 2 in fluid tight relationship.

Said bottom closure 3 is provided with the fluid inlet connection 16 which is in open communication with the inlet opening 16ª formed in the bottom closure. The inlet opening 16ª is in registry with the inlet passageway 17 formed in the body casing 2, and the inlet passageway 17 is in open communication with the inlet chamber 18 formed in the top cover 1. The inlet connection 16 is adapted to be connected to a source of fluid under pressure which is measured as it passes through the meter. For example, my improved meter may be mounted on an air eliminator chamber of a liquid dispensing apparatus such as disclosed in Letters Patent of the United States No. 2,351,331, granted to M. J. Goldberg, with the meter inlet 16 disclosed herein connected to the air eliminator outlet opening 26 of said patent. The air vent connection 185 disclosed herein would be substituted for the connection 30' of said patent.

I find it convenient to form the valve seat 23 as a separate flat plate which is integrally locked in the top wall 24 of the body casing 2 when said body casing 2 is die cast. It is obvious that said valve seat may be formed otherwise, for example, as a part of, or connected to, the top wall 24 of the body casing. Said valve plate 23 is provided with a series of port openings 26 which are in registry with openings 27 formed in the top wall 24 of the body casing 2. The openings 27 are larger than the openings 26 and, hence, the effective port area conveniently is determined by the configuration and area of the accurately formed ports 26 in the valve plate 23. Each port 26 is in open communication with its piston cylinder 28. I find it convenient to form said piston cylinders 28 as open end cylinders which are screw threaded at their upper ends and engage threaded openings 29 formed at the top of the body casing 2. The cup cylinders herein shown and described are claimed in application Serial No. 584,-

807, filed March 26, 1945, by W. H. D. Brouse for improvement in Steel cup cylinder for fluid meters, which has become abandoned.

Although I have illustrated my invention with reference to a 4-piston cylinder type of meter, it is obvious that the number of piston cylinders used is optional; and although I have shown and described the piston cylinders 28 in screw threaded engagement in the top of the body casing 2, it is obvious that said cylinders may be connected otherwise.

As best shown in Fig. 3, each of the cylinders 28 is provided with a piston assembly 35 which is mounted in a cylinder 28 for reciprocation in response to the fluid pressure on top of the piston. Each piston assembly 35 includes a telescopic connecting rod 36 provided at its lowermost end, as viewed in Fig. 3, with a ball end 37 which is mounted and confined in a socket 38 formed in the wabble plate 39. The connecting rod ball end 37 is retained in its socket 38 conveniently by means of a washer 38ª which is fastened to the wabble plate by any well known means, such as by providing the washer with ears which extend through holes in the wabble plate, with the ears clinched over on the under side of the wabble plate. The telescopic piston rod herein shown is claimed in my copending application Serial No. 584,720, filed March 24, 1945, for improvement in connecting rods. Although I have shown the sockets 38 formed as an integral part of the wabble plate 39, it is obvious that said sockets may be formed as separate stampings inserted into openings formed in said wabble plate, as is well known in the art.

Each piston assembly 35 includes a cup leather 40, piston backing plate 41, intermediate plate 42, piston spring retainer plate 43, and piston expander spring 45. Each piston assembly 35 is mounted on the screw threaded reduced portion 47 of its piston rod 36 and maintained in rigid position on its piston rod 36 by means of a nut 48. The piston assembly shown and described is of a well known construction wherein a piston expander spring is adapted to maintain the upturned edge of the cup leather in continuous frictional engagement with the side wall of the cylinder 28.

The web 50 of the wabble plate 39 is formed conveniently as a spider and includes a series of openings in spaced relation to the series of sockets 38 which are formed in enlarged portions in the spider arms of the wabble plate 39, as best shown in Fig. 11. Said openings are formed in the wabble plate merely to lessen the weight thereof. The wabble plate 39 is provided with the socket 52 and said wabble plate 39 is concentrically mounted in the chamber 30 on the hemispherically shaped ball end 53 of the adjusting screw 54.

Figure 7:
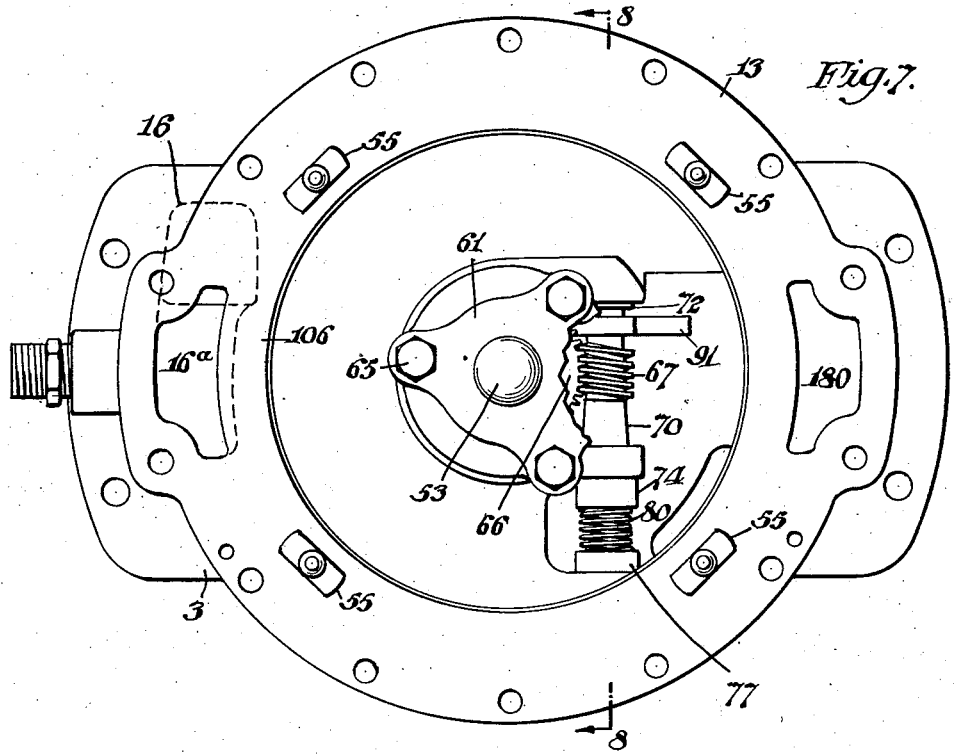
Fig. 7 is a top plan view of the bottom closure of the meter.

As best shown in Figs. 3, 7, and 8, rotation of the wabble plate 39 is prevented by means of a series of stabilizing guide pins 55 which are adapted to be engaged and disengaged in their respective notched openings formed in the outer periphery of the wabble plate 39. The wabble plate construction shown and described herein is claimed in my co-pending divisional application Serial No. 753,527, filed June 9, 1947.

The adjusting screw 54 is engaged in the screw threaded opening 60 formed in the support bracket 61 which is rigidly mounted on the shoulder 62, formed as an integral part of the bottom closure 3, by means of cap screws 65. The lower end of the adjusting screw 54 is provided with the gear 66 in rigid relationship therewith. The gear 66 is in engagement with the worm 67 rigidly fixed to, or formed on, the adjusting shaft 70. Although I have shown a gear and worm gear as the driving connection because a finer calibration adjustment may be effected therewith, it is obvious that other forms of gears, such as bevelled gears, may be used.

As best shown in Fig. 3, the wabble plate 39 is provided with the drive stem shaft 95 which is journalled in the drilled opening 96 formed in the driving block assembly 97 of the crank arm driving block assembly. Said driving block assembly 97 is mounted with freedom of pivotal movement on the crank arm pin 98, the opposite ends of which are held in the bifurcated crank arms 99 (only one of which is shown in Fig. 3) formed on the crank arm 100 rigidly connected to the lower end of the crank shaft 101. Said pin 98 extends through an elongated opening formed in said driving block 97; and, accordingly, said driving block 97 is thus mounted with freedom of both pivotal and reciprocatory movement in its sliding engagement within the bifurcated crank arms 99. Reciprocatory movement of the driving block 97 is limited by the pin 98 coming into engagement with either end of the elongated opening in the driving block. The driving block 97 is provided with the spring 102 held between the inner cup washer 103, in engagement with the ends of the bifurcated crank arms 99, and the outer washer 104 rigidly mounted on the right-hand end of the driving block 97 by means of a screw. Such a construction places a loading on the wabble plate stem shaft 95 substantially at right angles to the axis of said stem shaft 95, with the result that all of the forces of the spring 102 act to hold the wabble plate 39 on the wabble plate track 106 formed on the upper side of the bottom closure 3, as viewed in Fig. 3.

The wabble plate 39 is provided with the spring 108, the lower end of which encircles an offset formed at the top of the wabble plate 39. The upper end of said spring 108 is in engagement with the wabble plate bearing washer 109. The thrust washer 110 is interposed between the wabble plate bearing washer 109 and the bottom surface of the bifurcated arms 99. Said thrust washer 110 is provided with an upturned portion which is engaged with freedom of movement between the bifurcated arms 99, as best shown in Fig. 3. The crank arm and driving block assembly herein described is claimed in my copending application Serial No. 601,180, filed June 23, 1945.

Figure 4:
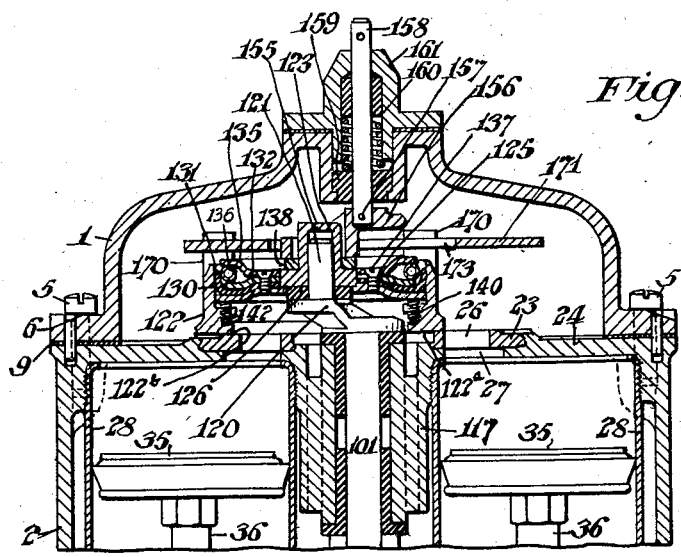
Fig. 4 is a fragmentary vertical sectional view taken on the line 4—4 in Fig. 1.
Figure 5:
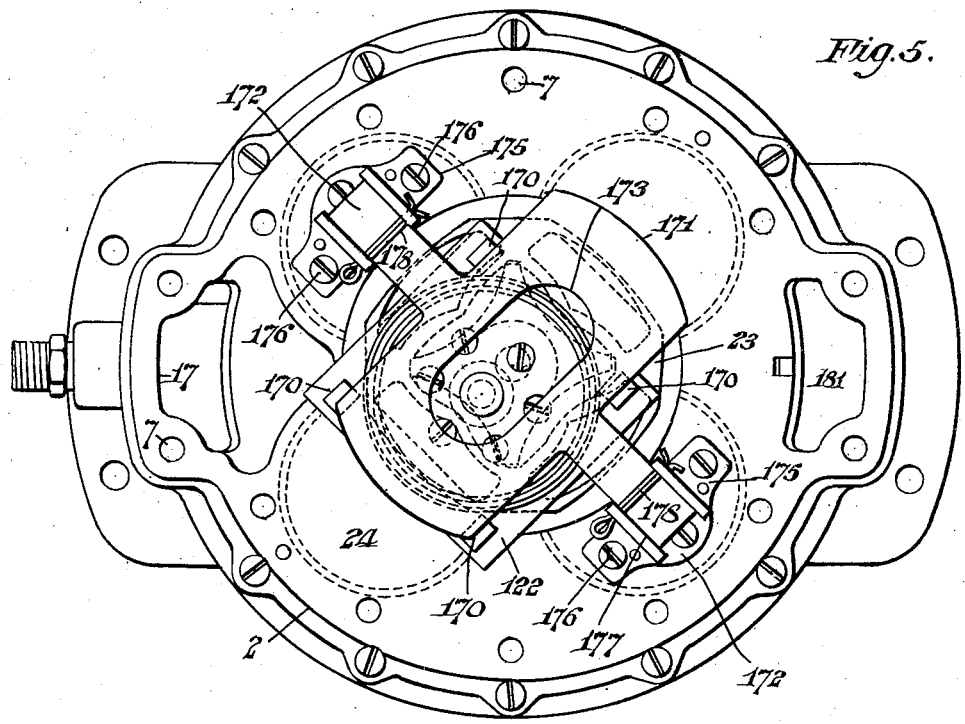
Fig. 5 is a top plan view of the meter shown in Figs. 1 to 4, but with the top cover removed.

The crank arm 100 is rigidly connected to the reduced lower end portion of the crank arm 101 by means of the nut 112. Said crank arm 101 is journalled in thrust bearings 113 and 115 which are press fitted in the opening 116 of the central hub bearing 117, which is formed as an integral part of the main body casing 2. As shown in Fig. 4, the crank shaft 101 is provided at its upper end, in integral relationship therewith, with the crank arm 120 and crank pin 121. The crank shaft 101 rotates in a clockwise direction, as viewed in Figs. 1 and 5, and it is to be noted that the crank arm 100 is fastened to said crank shaft 101 so that the arms 99 are in a position substantially 90° clockwise from the crank pin 121 which drives the meter valve 122.

As best shown in Fig. 4, the crank pin 121 is journalled in the bearing 123 formed in the imperforate inner section 125 of the valve 122. The friction thrust washer 126 is mounted on the pin 121 and interposed between the crank arm 120 and the bearing surface of the inner section 125. As best shown in Fig. 4 the valve is comprised of the solid outer valve portion 122 and the imperforate inner portion 125.

When the meter is operating under liquid pressure, the outer valve section 122 is pressed downwardly by a series of springs 140 positioned between the outer valve section 122 and the inner section 125, as best shown in Fig. 4, so that the valve seating surface 122ª seats on the valve seat 23. When the meter is standing idle, the upward stress against the inner section 125 is transmitted through the thrust washer 138, the upper surface of which bears against the drive shaft arm 156, which in turn may push the drive shaft 158 upwardly slightly until the upper surface of the drive shaft arm 156 comes into contact with the lower surface of the bearing 159. Thus, it will be noted that the vertical spaced relationship of the outer valve section 122 and the inner valve section 125 is maintained. The meter valve shown and described herein is claimed in my co-pending divisional application Serial No. 753,528, filed June 9, 1947.

Figure 10:
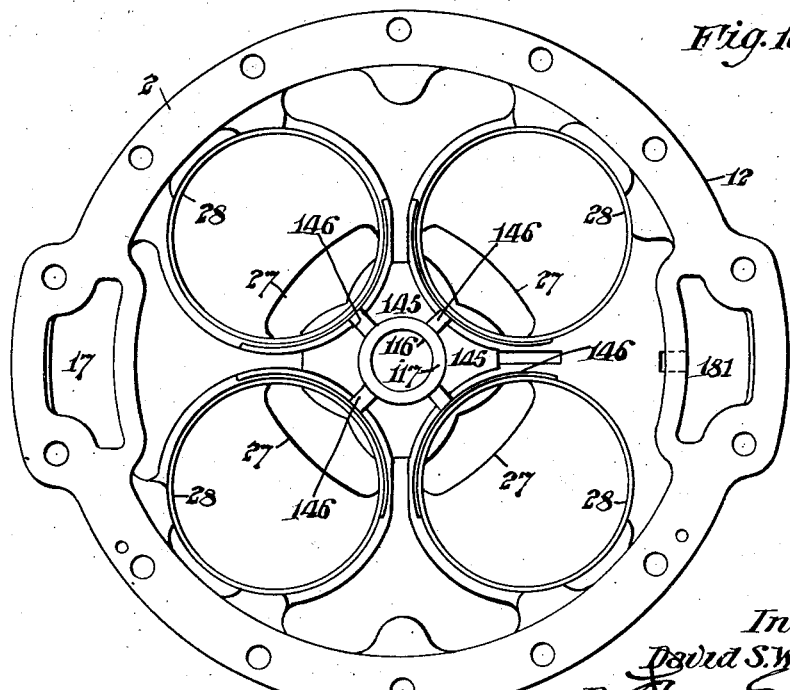
Fig. 10 is an inverted bottom plan view of the main body casing of the meter shown in Fig. 3.

The chamber 142, formed of the annular recess in the valve section 122 and closed at the top by the inner valve section 125, is in continuous open communication with the chamber 30 through the outlet ports 143 formed in the valve plate 23. Said outlet ports 143 are in registry with the outlet ports 145 formed around the bearing hub 117 by the hub support ribs 146 which are conveniently formed as an integral part of said hub 117. As best shown in the inverted plan view Fig. 10, the outer ends of the ribs 146 are bifurcated and arcuate concentrically with the cup cylinders 28, it is to be noted that the ribs 146 are formed on radii running on a line from the axis of the bearing hub 117 to the center of the cup cylinders 28 and, hence, afford a maximum outlet port area, and the entire outlet flow from the cylinders 28 is carried downwardly through the outlet ports 145 formed around the hub bearing 117 to the chamber 30. Such construction accomplishes the purging of possible entrained air and water from the outlet cavities; gives maximum outlet passageway area around the hub; provides maximum strength; and permits of a minimum use of materials in a design suitable for die casting. As best shown in Fig. 3, the upper ends of said ribs 146 are provided with the notched portions 150 to facilitate the flow of fluid from the chamber 142 through the outlet ports 145.

As best shown in Fig. 4, the projection 155 of the inner valve section 125, in which the bearing 123 is formed for the pin 121, forms the driving pin for the drive shaft arm 156 which is rigidly fastened by means of a tapered pin 157 to the lower end of the drive shaft 158. Said drive shaft 158 is adapted to be connected at its upper end, by any convenient means, to a recording mechanism which registers the volume of fluid passed by the meter.

Said valve is provided with a parallel motion mechanism, or "scotch yoke", to maintain parallel at all times each other straight side of the valve section 122 with the outer straight side of the respective valve port 26 controlled. The movement of the valve is restricted to a predetermined path of travel, as hereinafter described, by the valve yoke 171 co-acting with the lugs 170 and because the path of movement of the arms 172 is limited by the guide brackets 175 in which said arms 172 are mounted.

The oppositely extending arms 172 of the valve yoke 171 are respectively mounted in the guide brackets 175 which are rigidly fastened, by means of a series of screws 176, to the top wall 24 of the body casing 2. In view of the fact that the arms 172 of the yoke 171 are held in sliding engagement in the guide channels 177 of the fixed brackets 175, movement of the yoke 171 is limited to a horizontal movement on an axis coinciding with the lines 3—3 in Fig. 1. As movement of said yoke 171 is thus limited, movement of the valve (effected by the crank pin 121 journalled in the bearing 123 of the projection 155) is limited to a path of travel in which each outer straight side of the valve section 122 is at all times parallel to the outer straight side of its respective controlled valve port opening 26.

As best shown in Fig. 2, the chamber 30 is in open communication with the outlet passageway 180 formed in the bottom closure 3. Said outlet passageway 180 is in open communication with the outlet passageway 181 formed in the body casing 2, the outlet passageway 182 formed in the top cover 1, and the passageway 183 formed in the meter outlet cap 184. The meter outlet cap 184 is secured to the top of the top cover by means of a series of screws 186, one of which is shown in Fig. 2. The outlet passageway 183 is adapted to be connected to a conduit through which the fluid passed by the meter is dispensed. As best shown in Fig. 2, the outlet passageway 181 is in restricted open communication with the chamber 30 through the communicating passageway 187 formed in the wall at the top of the chamber 30. Communication between the top of said outlet passageway 181 and the top of the chamber 30 is desirable to carry off any air with the outgoing liquid, so as to displace quickly all of the air in the meter body when it is placed in service. If it were not for such communication between the outlet passageway 181 and the chamber 30, a certain amount of air woud be entrapped between the cylinder cups 28 and the body casing 2 for a considerable period of time before such air would be absorbed by the liquid. Entrapment of air would be objectionable because of alternate compression and expansion of such air during operation of the meter, depending upon the time elapsing between the closing of the dispensing nozzle valve in consecutive deliveries, and such alternate compression and reexpansion of air would result in variations in the recorded delivery of the meter.

Operation

Assuming the meter to be completely filled with liquid as installed in a conventional type gasoline pump, such as is disclosed in Letters Patent No. 2,351,331 granted June 13, 1944, to M. J. Goldberg, the meter inlet connection 16 is connected to the outlet of the air eliminator and, with liquid being dispensed through the meter, the liquid under pressure flows into the opening 16ª, and up the inlet passageway 17 to the inlet chamber 18 formed at the top cover 1. With the meter valve in the position shown in Fig. 4, the valve has moved to open the inlet port 26 to the right-hand cylinder 28 and fluid under pressure from the chamber 18 moves the piston assembly 35 in that cylinder downwardly. The inlet port 26 for the left-hand cylinder 28 is within the chamber 142 and, hence, fluid within the left-hand cylinder 28 is in the process of being discharged from that cylinder upwardly through the port opening 26 and through the outlet ports 145, formed around the bearing hub 117, to the outlet chamber 30 of the main body casing 2.

The liquid under pressure from the chamber 18 entering through the port 26 to the cylinder 28 at the right forces the piston assembly 35 in that cylinder downwardly, and such downward movement causes the wabble plate to nutate, thus causing the crankshaft 101 to revolve clockwise. Rotation of the wabble plate is prevented by the notched openings 56 in the outer periphery of the wabble plate engaging and disengaging the conical bearing surfaces of the series of stabilizing guide pins 55 rigidly mounted in the bottom closure 3. Accordingly, movement of the wabble plate is limited to a nutating movement.

Clockwise movement of the crankshaft 101 moves the meter valve, including the outer valve section 122 and inner valve section 125, clockwise. As the meter valve is rotated clockwise, the inlet ports 26 to the various cylinders 28 are opened and closed, with the liquid being discharged from the cylinders 28 through the outlet ports 145 on the upward strokes of the pistons.

As the meter operates, liquid is forced downwardly in the chamber 30 and to the outlet passageway 180, formed in the bottom closure 3, and thence through the outlet passageway 181 formed in the body casing 2, the outlet passageway 182 formed in the top cover 1 and the outlet passageway 183 formed in the meter outlet cap 184 to a conduit which, in a liquid dispensing apparatus, is connected to the valve controlled dispensing nozzle of such apparatus.

It is to be noted that since the meter shown and described herein has four pistons, the meter construction shown could not stop on a so-called dead center as would be possible in a two cylinder single acting structure.

Since the valve 122 is provided with parallel motion mechanism, including the yoke 171, etc., heretofore described, each outer straight line of the valve section 122 is maintained parallel at all times with the outer straight line of the respective valve port opening 26, as may be observed from the drawings. Thus, when a port 26 is being opened to afford communication between the inlet chamber 18 to the cylinder 28, said port will be opened the entire length of the outer straight side of the port and to a larger area than would be possible in meters of the prior art provided with the conventional rotary type of valves. This is true even with the initial opening movement of the valve section 122.

Correspondingly, a relatively large area of the port opening 26 will continue to be open as the valve 122 approaches its closure point across a port 26 when communication between the inlet chamber 18 and cylinder 28 is being shut off. The inner circular valving edge portion 122b formed in the outer valve section 122 has substantially the same radius as the segments of circles forming the curvilinear inner surface of a port 26. Because of such configuration, when the port 26 is serving as the passageway from the cylinder 28 to the chamber 142 (and thence to the meter outlet passageway) one curvilinear line comprising nearly half the length of the port 26 will open as the circular valve portion 122b of the valve 122 passes over the edge of the port 26, and a relatively large area is quickly opened to the outlet passageways. When the valve 122 is approaching the closure point on a port 26 as liquid is being discharged from a cylinder 28 to the chamber 142, the other curvilinear portion of the inner edge of the port 26 maintains, until complete closure, a larger area of port opening than would be possible in the conventional rotary-type meter valves of the prior art.

Accordingly, my improved construction results in a greater average valve opening throughout the stroke of the piston 35 on both its inlet cycle and its outlet cycle, and reduces the fluid pressure loss in the meter required for its operation. Such condition results in a corresponding increase in accuracy and long life of my improved meter.

Figure 6:
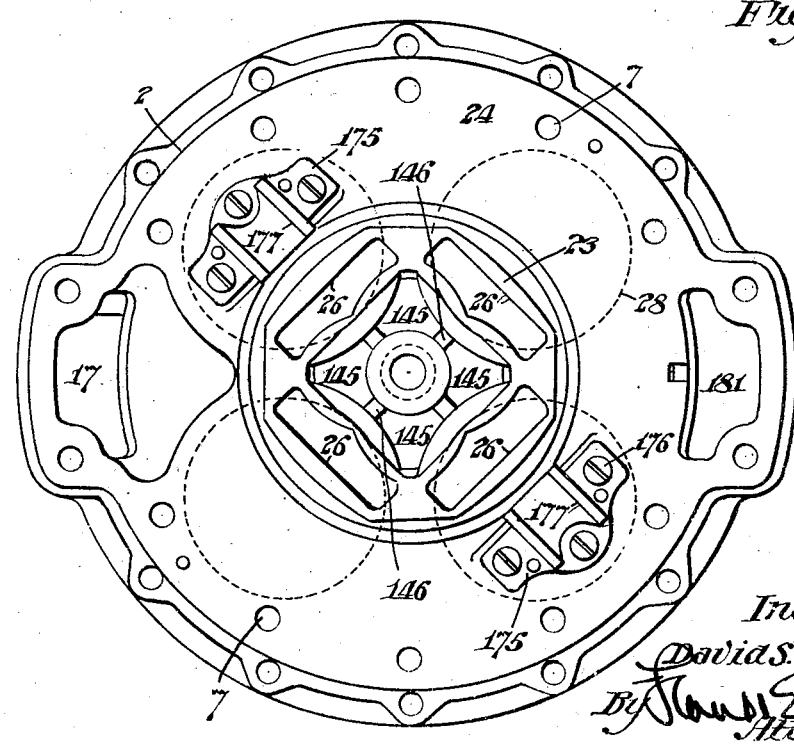
Fig. 6 is a top plan view of the meter structure as shown in Fig. 5, but with the scotch yoke, meter valve, and crankshaft removed to show the positions and configurations of the valve ports in the top of the main body casing.

It is to be noted that the entire outlet flow of fluid from the cylinders 28 passes downwardly through the outlet ports 145 formed around the hub bearing 117. It is only possible to provide outlet ports 145 of sufficient area around the bearing hub 117 by forming the bearing hub supporting ribs 146 on radii which run from the axis of the bearing hub 117 to the center of the cup cylinders 128. As may be observed from Fig. 6, the outlet port area would be materially reduced if the ribs 146 were formed other than on radii running from the axis of the bearing hub to the center of the cup cylinders.

It is obvious that various modifications may be made in my invention without departing from the essential features thereof as defined in the appended claims and, therefore, I do not wish to limit myself to the precise details of construction and arrangement herein set forth.

I claim:

1. A meter body comprising a casing, a plurality of piston cylinders, a hub bearing for a meter crankshaft, a plurality of radial ribs extending from said hub bearing on radii running from the axis of said hub bearing to the centers of said piston cylinders and forming outlet ports around said hub bearing, and bifurcated arcuate arms at the outer ends of said ribs encompassing said piston cylinders.

2. An integral meter body comprising a casing, a plurality of piston cylinders, a central hub bearing for a meter crankshaft, a plurality of radial ribs extending from said central hub bearing on radii running from the axis of said central hub bearing to the centers of said piston cylinders and forming outlet ports around said hub bearing, and bifurcated arcuate arms at the outer ends of said ribs encompassing said piston cylinders.

3. An integral meter body comprising a casing, a plurality of piston cylinders, a central hub bearing for a meter crankshaft, a plurality of radial ribs extending from said central hub bearing on radii running from the axis of said central hub bearing to the centers of said piston cylinders and forming outlet ports around said central hub bearing, and bifurcated arms, formed concentrically with said piston cylinders, at the outer ends of said ribs and adapted to encompass said piston cylinders.

DAVID S. WILLSON.

REFERENCES CITED

The following references are of record in the file of this patent:

UNITED STATES PATENTS

| Number | Name | Date |
| --- | --- | --- |
| 1,299,477 | Kendall | Apr. 8, 1919 |
| 2,134,277 | Sproul et al. | Oct. 25, 1938 |
| 2,237,518 | Blum | Apr. 8, 1941 |